US010266434B2

(12) United States Patent
Smith et al.

(10) Patent No.: US 10,266,434 B2
(45) Date of Patent: *Apr. 23, 2019

(54) COMPOSITION AND METHOD FOR REMEDIATION OF CONTAMINATED WATER

(71) Applicant: JRW BIOREMEDIATION LLC, Lenexa, KS (US)

(72) Inventors: Donovan Smith, Parkville, MO (US); Gwyn Isenhouer, Lawrence, KS (US); Michael R. Sieczkowski, Lenexa, KS (US)

(73) Assignee: JRW BIOREMEDIATION, LLC, Lenexa, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 15/353,540

(22) Filed: Nov. 16, 2016

(65) Prior Publication Data
US 2017/0057850 A1 Mar. 2, 2017

Related U.S. Application Data

(63) Continuation of application No. 14/048,442, filed on Oct. 8, 2013, now Pat. No. 9,522,830.

(60) Provisional application No. 61/712,006, filed on Oct. 10, 2012.

(51) Int. Cl.
*C02F 1/68* (2006.01)
*C02F 1/70* (2006.01)
*C02F 1/72* (2006.01)
*C02F 3/30* (2006.01)
*B09C 1/00* (2006.01)
*B09C 1/08* (2006.01)
*C02F 3/34* (2006.01)
*C02F 101/00* (2006.01)
*C02F 101/20* (2006.01)
*C02F 101/30* (2006.01)
*C02F 101/32* (2006.01)
*C02F 101/36* (2006.01)

(52) U.S. Cl.
CPC ............... *C02F 1/68* (2013.01); *B09C 1/002* (2013.01); *B09C 1/08* (2013.01); *C02F 1/70* (2013.01); *C02F 1/705* (2013.01); *C02F 1/72* (2013.01); *C02F 3/30* (2013.01); *C02F 3/34* (2013.01); *C02F 2101/003* (2013.01); *C02F 2101/20* (2013.01); *C02F 2101/203* (2013.01); *C02F 2101/306* (2013.01); *C02F 2101/32* (2013.01); *C02F 2101/322* (2013.01); *C02F 2101/36* (2013.01); *C02F 2305/06* (2013.01)

(58) Field of Classification Search
None
See application file for complete search history.

(56) References Cited

U.S. PATENT DOCUMENTS

| | | |
|---|---|---|
| 2,282,794 A | 5/1942 | Sidney |
| 4,156,647 A | 5/1979 | Nieuwenhuis |
| 4,401,569 A | 8/1983 | Jahaveri et al. |
| 4,565,552 A | 1/1986 | Cotton |
| 4,585,482 A | 4/1986 | Tice et al. |
| 5,006,250 A | 4/1991 | Roberts et al. |
| 5,071,754 A | 12/1991 | Walkup et al. |
| 5,089,123 A | 2/1992 | Devoe |
| 5,200,343 A | 4/1993 | Cole et al. |
| 5,264,018 A | 11/1993 | Koenigsberg et al. |
| 5,266,213 A | 11/1993 | Gillham |
| 5,277,815 A | 1/1994 | Beeman |
| 5,308,759 A | 5/1994 | Geirhart |
| 5,342,769 A | 8/1994 | Hunter et al. |
| 5,395,419 A | 3/1995 | Farone et al. |
| 5,411,664 A | 5/1995 | Seech et al. |
| 5,434,241 A | 7/1995 | Kim et al. |
| 5,447,639 A | 9/1995 | Sivavec |
| 5,464,771 A | 11/1995 | Bryant et al. |
| 5,516,688 A | 5/1996 | Rothmel |
| 5,534,154 A | 7/1996 | Gillham |
| 5,554,290 A | 9/1996 | Suthersan |
| 5,560,904 A | 10/1996 | Laugier et al. |
| 5,575,927 A | 11/1996 | Sivavec et al. |
| 5,587,317 A | 12/1996 | Odom |
| 5,602,296 A | 2/1997 | Hughes et al. |
| 5,611,936 A | 3/1997 | Fernando et al. |
| 5,616,253 A | 4/1997 | Fernando et al. |
| 5,618,427 A | 4/1997 | Seech et al. |
| 5,658,795 A | 8/1997 | Kato et al. |
| 5,753,122 A | 5/1998 | Taylor et al. |
| 5,750,036 A | 6/1998 | Sivavec |
| 5,759,389 A | 6/1998 | Fernando et al. |
| 5,766,929 A | 6/1998 | Orolin et al. |
| 5,833,855 A | 11/1998 | Saunders |
| 5,840,571 A | 11/1998 | Beeman et al. |

(Continued)

FOREIGN PATENT DOCUMENTS

| | | |
|---|---|---|
| WO | WO 1999/024367 | 5/1999 |
| WO | WO 1999/066080 | 12/1999 |
| WO | WO 2001/032715 | 5/2001 |

OTHER PUBLICATIONS

Ma et al., "A sulfur-tolerant Pd/CeO2 catalyst for methanol synthesis from syngas," J. of Nat. Gas Chem., 17: 387-390 (2008).*

(Continued)

Primary Examiner — Chester T Barry
(74) Attorney, Agent, or Firm — Lathrop Gage LLP

(57) ABSTRACT

Compositions and methods for remediation of contaminated materials, such as contaminated water, are provided. The composition may include at least one fermentable compound and at least one metal or metal containing compound to promote conversion of the contaminants into non-toxic substances through abiotic and/or biotic processes. The composition may further include sulfur or a sulfur containing compound, and/or microorganisms or derivative thereof.

2 Claims, No Drawings

(56) References Cited

U.S. PATENT DOCUMENTS

| | | | |
|---|---|---|---|
| 5,910,245 A | 6/1999 | Bernhardt et al. | |
| 5,932,472 A | 8/1999 | Abdullah | |
| 5,975,798 A | 11/1999 | Liskowitz et al. | |
| 5,993,658 A | 11/1999 | Kato et al. | |
| 6,001,252 A | 12/1999 | Rice et al. | |
| 6,039,882 A | 3/2000 | Wolfe et al. | |
| 6,039,966 A | 3/2000 | Kostka et al. | |
| 6,207,073 B1* | 3/2001 | Wolfe | B09C 1/002 252/175 |
| 6,207,114 B1 | 3/2001 | Quinn et al. | |
| 6,238,570 B1 | 5/2001 | Sivavec | |
| 6,242,663 B1 | 6/2001 | Ponder et al. | |
| 6,261,986 B1 | 7/2001 | Bowman et al. | |
| 6,264,841 B1 | 7/2001 | Tudor | |
| 6,265,205 B1 | 7/2001 | Hitchens et al. | |
| 6,303,367 B1 | 10/2001 | Kataoka et al. | |
| 6,382,133 B1 | 5/2002 | Gednalske et al. | |
| 6,420,594 B1 | 7/2002 | Farone et al. | |
| 6,423,531 B1 | 7/2002 | Hince et al. | |
| 6,432,693 B1 | 8/2002 | Hince | |
| 6,464,864 B2 | 10/2002 | Sivavec | |
| 6,472,198 B1 | 10/2002 | Semprini et al. | |
| 6,492,572 B2 | 12/2002 | Batchelor et al. | |
| 6,527,691 B1 | 3/2003 | Moore | |
| 6,562,235 B1 | 5/2003 | Newell et al. | |
| 6,589,776 B1 | 7/2003 | Harkness | |
| 6,602,421 B2 | 8/2003 | Smith | |
| 6,664,298 B1 | 12/2003 | Reinhart et al. | |
| 6,689,485 B2 | 2/2004 | Ponder et al. | |
| 6,699,707 B1 | 3/2004 | Hince | |
| 6,719,902 B1 | 4/2004 | Alvarez et al. | |
| 6,770,205 B1 | 8/2004 | Schroder et al. | |
| 6,783,678 B2 | 8/2004 | Sorenson et al. | |
| 6,787,034 B2 | 9/2004 | Noland et al. | |
| 6,884,352 B1 | 4/2005 | Kennedy | |
| 7,008,964 B2 | 3/2006 | Clausen et al. | |
| 7,037,946 B1 | 5/2006 | Reinhart et al. | |
| 7,045,339 B2 | 5/2006 | Sorenson et al. | |
| 7,128,841 B2 | 10/2006 | Zhang | |
| 7,138,059 B2 | 11/2006 | Sorenson et al. | |
| 7,138,060 B2 | 11/2006 | Cuthbertson | |
| 7,166,228 B2 | 1/2007 | Ludwig et al. | |
| 7,166,759 B2 | 1/2007 | Nakamaru et al. | |
| 7,271,199 B1 | 9/2007 | Quinn et al. | |
| 7,338,678 B2 | 3/2008 | Yim | |
| 7,347,647 B2 | 3/2008 | Seech et al. | |
| 7,445,717 B2 | 11/2008 | Cha et al. | |
| 7,479,259 B2 | 1/2009 | Kim et al. | |
| 7,507,345 B2 | 3/2009 | Zhang | |
| 7,582,682 B2 | 9/2009 | Quinn et al. | |
| 7,611,637 B2 | 11/2009 | Zhang | |
| 7,635,236 B2 | 12/2009 | Zhao et al. | |
| 7,641,971 B2 | 1/2010 | Papagianakis | |
| 7,674,526 B2 | 3/2010 | Feitz et al. | |
| 7,842,639 B2 | 11/2010 | Quinn et al. | |
| 7,897,798 B2 | 1/2011 | McNeff et al. | |
| 7,887,709 B2 | 2/2011 | Schaefer et al. | |
| 7,887,880 B2 | 2/2011 | Zhao et al. | |
| 7,897,049 B2 | 3/2011 | Ghosh et al. | |
| 7,959,806 B2 | 6/2011 | Sieczkowski et al. | |
| 8,057,675 B2 | 11/2011 | Baseeth et al. | |
| 9,522,830 B2* | 12/2016 | Smith | B09C 1/08 |
| 2002/0061584 A1 | 5/2002 | Farone et al. | |
| 2004/0069720 A1 | 4/2004 | Clausen et al. | |
| 2005/0109696 A1 | 5/2005 | Sorenson | |
| 2005/0239189 A1 | 10/2005 | Schaffner | |
| 2005/0263454 A1 | 12/2005 | Sorenson | |
| 2006/0000783 A1 | 1/2006 | Branning et al. | |
| 2007/0051676 A1 | 3/2007 | Chandraghatgi | |
| 2008/0227179 A1 | 9/2008 | Smith et al. | |
| 2008/0272051 A1 | 11/2008 | Baseeth et al. | |
| 2011/0197640 A1* | 8/2011 | Harman | B01D 53/02 71/23 |
| 2012/0178147 A1* | 7/2012 | Krajmalnik-Brown | A62D 3/02 435/252.4 |
| 2012/0305479 A1* | 12/2012 | Falatko | C02F 3/28 210/610 |

OTHER PUBLICATIONS

Zhang et al., "Synthesis of methyl mercaptan and thiophene from CO/H2/H2S using alpha-Al2O3," Catal. Letters., 91:3-4 (Dec. 2003), 181-183.*

The Manual on Industrial Water, ASTM International, Philadelphia (1956), at pp. 202-203.*

Brennan (Mar. 1, 2006) Passive Remediation of Acid Mine Drainage Using Chitin. 7 pgs.

Brennan et al. (2006) "Biodegradation of Tetrachloroethene by Chitin Fermentation Products in a Continuous Flow Column System," Journal of Environmental Engineering. 132(6):664-673.

Callaway et al. (1997) "Effects of a *Saccharomyces cerevisiae* culture on ruminal bacteria that utilize lactate and digest cellulose," J. Dairy Sci. 80:2035-2044.

Daubert et al. (2006) "A Laboratory Investigation of Passive Acid Mine Drainage Treatment Using Chitin," (URE Poster) Apr. 2006, 1 pg.

Daubert et al. (Dec. 1, 2007) "Passive remediation of acid mine drainage using crab shell chitin" Database Accession No. E20075110981694. Engineering Information Inc. New York, New York. 1 pg.

Koenigsberg et al. (2000) "Time Release Electron Donor Technology for Acclerated Biological Reductive Dechlorination," In; Bioremediation and Phytoremediation. Battelle Press. pp. 39-46.

Laus et al. (2007) "Reduction of Acidity and Removal of Metal Ions From Coal Mining Effluents Using Chitosan Microspheres," Journal of Hazardous Materials. 149(2):471-474.

Miller-Webster et al. (2002) "Influence of Yeast Culture on Ruminal Microbial Metabolism in Continuous Culture," J. Dairy Sci. 85:2009-2014.

Moret et al. (2003) "Sulphate and Molybdate Ions Uptake by Chitin-Based Shrimp Shells," Minerals Engineering. 16(8):715-722.

Nisbet et al. (1991) "Effect of a *Saccharomyces cerevisiae* culture on lactate utilization by the ruminal bacterium *Selenomonas ruminantium*," J. Anim. Sci. 69:4628-4633.

Rockne et al. (Oct. 2003) "Bioremediation of Contaminated Sites," In; International e-Conference on Modern Trends in Foundation Engineering: Geotechnical Challenges and Solutions. pp. 1-22.

Sacakli et al. (2013) "Usage of brewer's yeast (*Saccharomyces cerevisiae*) as a replacement of vitamin and trace mineral premix in broiler diets," Revue de Médecine Vétérinaire. 164(1):39-44.

Vera et al. (2001) "Evaluation of Different Polymeric Organic Materials for Creating Conditions That Favor Reductive Processes in Groundwater," Bioremediation Journal. 5(3):169-181.

U.S. Appl. No. 12/049,959, Final Office Action dated Jun. 5, 2015, 14 pages.

U.S. Appl. No. 12/049,959, Office Action dated May 11, 2012, 10 pages.

U.S. Appl. No. 12/049,959, Office Action dated Nov. 23, 2012, 12 pages.

U.S. Appl. No. 12/049,959, Response to Final Office Action filed Feb. 25, 2013, 14 pages.

U.S. Appl. No. 12/049,959, Response to Office Action filed Aug. 13, 2012, 5 pages.

U.S. Appl. No. 12/049,959, Response to Office Action filed Mar. 8, 2012, 10 pages.

U.S. Appl. No. 12/049,959, Response to Restriction Requirement filed Sep. 21, 2011, 9 pages.

U.S. Appl. No. 12/049,959, Restriction Requirement dated Jul. 21, 2011, 6 pages.

U.S. Appl. No. 12/111,099, Notice of Allowance dated Feb. 4, 2011, 5 pages.

U.S. Appl. No. 12/111,099, Office Action dated Sep. 17, 2010, 6 pages.

U.S. Appl. No. 12/111,099, Response to Office Action filed Jan. 18, 2011, 12 pages.

U.S. Appl. No. 12/111,099, Response to Restriction Requirement filed Jul. 27, 2010, 7 pages.

(56) References Cited

OTHER PUBLICATIONS

U.S. Appl. No. 12/111,099, Restriction Requirement dated Jun. 28, 2010, 5 pages.
U.S. Appl. No. 12/111,099, Supplemental Notice of Allowability dated Apr. 14, 2011, 3 pages.
PCT/US2008/057250, Invitation to Pay Additional Fees and Partial International Search Report, dated Jul. 23, 2008; 4 pages.
PCT/US2008/061808 International Search Report and Written Opinion, dated Aug. 7, 2008; 14 pages.

* cited by examiner

COMPOSITION AND METHOD FOR REMEDIATION OF CONTAMINATED WATER

RELATED APPLICATIONS

This application is a continuation of U.S. patent application Ser. No. 14/048,442 filed Oct. 8, 2013 now issued as U.S. Pat. No. 9,522,830, which claims priority to U.S. provisional patent application Ser. No. 61/712,006 filed on Oct. 10, 2012, the entire content of each of the above applications is incorporated herein by reference into this application.

FIELD OF THE INVENTION

The present disclosure pertains to the use of certain compositions for remediation of contaminated materials or media, such as contaminated water.

BACKGROUND

Chlorinated solvents are the most common class of groundwater contaminants found at hazardous waste sites in the United States. In a list of the top 25 most frequently detected contaminants at such sites, the Agency for Toxic Substances and Disease Registry (ASTDR) found that ten of the top twenty contaminants were chlorinated solvents or their degradation products. National Research Council, Alternatives for Groundwater Cleanup (National Academy Press, Washington, D.C. 1994). The same survey found that a common contaminant, trichloroethene (TCE) is present at more than 40% of the National Priority List sites. Remediation of groundwater contaminated by these compounds presents unique obstacles related to their inherent characteristics, including hydrophobicity and high density. Recent advances in the understanding of biodegradation processes involving chlorinated solvents permit remediation of residual contamination source areas in low permeability, saturated or variably saturated soils at a much lower cost than conventional methods. One example of such development is provided in U.S. patent application Ser. No. 12/049,959, which is incorporated by reference into this disclosure in its entirety.

Metals, perchlorates, explosives, and other contaminants also appear on lists of contaminants frequently detected at hazardous waste sites. Volatile organic and semi-volatile petroleum hydrocarbons and other associated contaminants are significant contaminants related with the petroleum exploration, production, transportation, processing, and distribution industries.

SUMMARY

The present disclosure advances the art by providing various compositions for remediation and methods for remediation of contaminated sites or contaminated materials. Non-limiting embodiments include, but are not limited to, compositions and methods that facilitate degradation of certain non-aqueous and aqueous halogenated organic compounds, nitrate-containing compounds, perchlorate, explosives, volatile organic petroleum hydrocarbons, semi-volatile organic petroleum hydrocarbons, explosives, pesticides, herbicides, rodenticides, metals, and inorganic minerals that may be degraded or immobilized to form non-toxic, less toxic or soluble compounds.

It is disclosed here improved compositions for remediation of contaminated materials or contaminated sites. It is also disclosed systems and methods using any of the disclosed compositions, alone or in combination, for remediation of contaminated materials or contaminated sites.

In one embodiment, the disclosed compositions may contain at least one fermentable compound and at least one metal or metal containing compound, among others. Examples of suitable fermentable compounds may include but are not limited to carbohydrates, alcohols, esters, polymers, fats, oils, organic acids, salts of organic acids, carboxylates, aromatic hydrocarbons, carboxylic acids, salts of carboxylic acids, sugars, or combinations thereof. The total amount of the at least one fermentable compound may be within the range of from 35% to 50% by weight of the composition, or in the range of from 40% to 45% by weight.

In one aspect, the at least one fermentable compound may be sodium carboxylate or potassium carboxylate. Examples of carboxylate may include but are not limited to sodium or potassium lactate, sodium or potassium propionate, sodium or potassium acetate, sodium or potassium butyrate. In another aspect, the composition may contain at least two member selected from the group consisting of sodium or potassium lactate, sodium or potassium propionate, sodium or potassium acetate, sodium or potassium butyrate. In another aspect, the at least one fermentable compound may be sodium lactate, and the amount of the sodium lactate is within the range of 30-45%, 33-40%, or 35-40% by weight of the total composition.

Examples of the at least one metal or metal containing compound may include but are not limited to metals, chelated metals, metal compounds, minerals containing both metals and sulfur, metal chlorides, metal sulfates, metal sulfides, or combinations thereof. In one aspect, the at least one metal or metal containing compound may be selected from the group consisting of ferrous gluconate, Fe(II) chloride, ferrous citrate dibasic, ferric citrate, ferric ammonium citrate, $FeSO_4$ and combination thereof. In one embodiment, the metal or metal containing compound is ferrous gluconate, and the ferrous gluconate is at from 2% to 12% (w/w), from 3% to 10.4% (w/w), from 4% to 10.4% (w/w), or from 6% to 10.4% by weight of the total composition.

In another embodiment, the composition may also contain an additional component, such as sulfur or sulfur containing compound(s). By way of example, the sulfur or sulfur containing compound may be selected from the group consisting of sulfur, sulfuric acid, salts of sulfuric acid, sulfur containing amino acid, sulfur containing organic compounds, sulfur containing inorganic compounds, sulfoxides, minerals containing both metals and sulfur, metal sulfates, metal sulfides, and combinations thereof. More specific examples of the sulfur or sulfur containing compound may be sodium thiosulfate or magnesium sulfate. In one aspect, the sulfur or sulfur containing compound is magnesium sulfate at a concentration of from about 1% to 16%, or from about 1.3% to 13% by weight of total composition. In another aspect, the sulfur or sulfur containing compound is sodium thiosulfate at a concentration of from about 1% to 20%, or from about 1.5% to 15.6% by weight of total composition.

In one aspect, the molar ratio between Fe and S in the disclosed composition may be about 1:2, 1:1.6, 1:1.2, or 1:1.

In another embodiment, the composition may also contain an additional component, such as an organic stabilizing agent such as DMSO, cystine, or both. In another embodiment, the composition may also contain a yeast metabolite as described in U.S. patent application Ser. No. 12/049,959.

In one embodiment, the disclosed system and method may utilize naturally occurring microorganisms at or around the site of contamination to facilitate the remediation. In another embodiment, at least one bacterium capable of converting tetrachloroethene (PCE) to ethene may be included in the disclosed composition or may be added before or after administration of the composition to the contaminated site.

The disclosed composition may be in the form of a liquid, a granular solid, a powder or in a solution form, such as an acidic solution.

In another embodiment, a system for introducing a remediation composition into a source of contaminated media may comprise a composition comprising a carbohydrates, alcohols, esters, polymers, fats, oils, organic acids, salts of organic acids, carboxylates, aromatic hydrocarbons, carboxylic acids, salts of carboxylic acids, sugars, amino acids, salts of amino acids, metals, chelated metals, metal compounds, minerals containing both metals and sulfur, metal chlorides, metal sulfates, metal sulfides, carbonates, bicarbonates, sulfur, sulfuric acid, salts of sulfuric acid, sulfur containing organic compounds, sulfur containing inorganic compounds, sulfoxides. The system may also include yeast, yeast derivatives, bacteria, other microorganisms or any combinations thereof. The system may further include a source of contaminated media (e.g., water) and a conduit configured for placing the remediation composition in contact with the contaminated media.

In another embodiment, a method for remediation of a contaminated medium or a contaminated site is disclosed, wherein at least one fermentable compound and at least one metal or metal containing compound are introduced into the contaminated medium or site, and at least a portion of the amount of contaminant is converted into an innocuous derivative thereof such as carbon dioxide, water, salts or minerals. In one aspect, at least 20%, 30%, 40%, 50%, 60%, 70%, 80%, 90%, or 99% of the contaminant in the medium or at the site is converted into an innocuous derivative. Examples of innocuous derivative may include but are not limited to carbon dioxide, water, salts or minerals.

DETAILED DESCRIPTION

Remediation of sites or materials contaminated by compounds that are difficult to clean remains a challenge. Examples of such compounds include but are not limited to certain non-aqueous and aqueous halogenated organic compounds, nitrate-containing compounds, perchlorate, explosives, volatile organic petroleum hydrocarbons, semi-volatile organic petroleum hydrocarbons, explosives, pesticides, herbicides, rodenticides, metals, and inorganic minerals. In the reductive dechlorination process, chloroethenes act as electron acceptors. In the aerobic biological process, petroleum hydrocarbons may act as electron donors. This participation by the contaminating chemicals implies that the remediation processes may be limited in the field by the availability of sufficient, suitable electron donors or electron acceptors. In one aspect, carbon substrates may be used as electron donors to enhance reductive dechlorination of halogenated solvents, perchlorate and certain metals. In another aspect, sulfate and ferric iron may act as electron acceptors for the degradation of contaminant such as petroleum hydrocarbons under highly anaerobic conditions.

Manipulating the reductive-oxidation condition through both biological and chemical means may result in multiple degradation pathways. This manipulation may be the result of introducing organics and metals directly into the subsurface to produce the desired effects but can also increase the efficiency and kinetics of the naturally occurring processes involving metals, minerals, and organics. The mineral of particular interest is usually found in a form of sulfur. Due to cost, the metal of typical interest is usually in some forms of iron. Other naturally occurring minerals and metals may play important roles as well, depending on site specific geochemical conditions.

Research into the anaerobic degradation pathways of chlorinated ethenes, ethanes, and other anaerobically degradable contaminants has begun to evaluate the biotic and abiotic contributions to overall material degradation. Both biotic and abiotic processes may contribute to the remediation. For instance, combining organics with either zero valent iron (ZVI) or dual valent iron (DVI) may promote both abiotic and biotic contaminant degradation. Benefits of this combination of biological and chemical processes include maximizing abiotic degradation rates by keeping the iron surfaces reduced by providing electrons as a result of substrate fermentation, soluble iron reduction, and direct iron reducing bacterial activity.

When solid ZVI and DVI particles are suspended in the contaminated media having low permeability, distribution of the particles through the system may be difficult to achieve. In one aspect, iron particles in solution or as part of an emulsion system may be suspended on site to increase distribution. In another aspect, the problem may be solved by broadly dispersing a mixture of soluble DVI within an organic to promote distribution throughout the aquifer. Biological processes mainly revolved around the application of a carbon substrate to enhance reductive dechlorination. Under many circumstances, existing microbial communities are sufficient to stimulate the process; however, the process may also be stimulated through the addition of microbial communities such as yeast or bacteria into the contaminated materials or sites.

In another embodiment, the chemical process of remediation may include the use of minerals, such as zero valent iron (ZVI), as in-situ chemical reductants (ISCR). As the biological mechanisms of anaerobic metabolism became better understood, it became apparent that many degradation pathways cannot be easily attributable to strictly biological processes but fit easily into chemical reductive processes. Data from sites where both processes are active suggest that there may be a synergistic effect from biotic and abiotic processes. For example, biotic substrate fermentation, soluble iron reduction, and direct iron-reducing bacterial activity provide electrons which keep iron surfaces reduced, thereby maximizing abiotic degradation. This process may also reduce indigenous metals or minerals such as sulfur compounds, resulting in additional ISCR particles in the system formed from naturally occurring metals and minerals. Additionally, carbon conservation through biomass decay may extend the electron shuttling effect, thereby increasing the longevity of the application.

In another aspect, the main challenge with the introduction of an ISCR is a general inability to transport the material away from the injection points to ensure adequate coverage and contact with the contaminant. Most of the biotic/abiotic combinations have relied on mixing components on site, injecting components sequentially into the aquifer system, or suspending the ISCR particles in solution or as part of an emulsion system to increase distribution. Several problems exist for practitioners. For example, oxidation of the ISCR particle may occur upon mixing or injection. Also, remediation efficiency may be hindered by precipitation of the ISCR particle near the injection point, and by the lack of ISCR particle distribution into tight lithologies such as clays where contaminants may be sorbed.

Current compounds using solid metal species coalesce their metal fraction over a short period of time, thereby limiting distribution. Field mixing and continual agitation of the organic component with the metal component may solve some of these problems, but such mechanical mixing increases the cost of the overall injection. Moreover, no mechanism has been provided for the inclusion of minerals such as sulfur to help stabilize the process under reducing conditions. A significant advantage would be achieved if low-cost soluble ISCR reagents could be incorporated into one easily manageable material that incorporates both biotic and abiotic remedial properties with the distribution characteristics of a liquid that transports in ground water like a miscible material.

In another embodiment of this disclosure, a method for remediation may include placing a composition in contact with a contaminated medium such as water. The composition comprises an organic material capable of causing a change in the reductive oxidation potential of an environment when metabolized either through co-metabolism, fermentation, oxidation, or reduction mixed with a metal or metal containing compound such as iron. Although iron is used as an example of the metal herein, other metals, particularly transition metals may be utilized with the invention. Typically, this fermentation of organic compounds is an enzyme-facilitated degradation of the organic compound by bacteria, yeast or other microorganism under anaerobic or anoxic conditions. Although the process is intended to provide sufficient organic material and metal to promote robust biological and chemical degradation, the process may also increase the degradation characteristics of native metals, minerals, and organics. The composition may further comprise a compound selected from the group consisting of a carbohydrates, alcohols, esters, polymers, fats, oils, organic acids, salts of organic acids, carboxylates, aromatic hydrocarbons, carboxylic acids, salts of carboxylic acids, sugars, amino acids, salts of amino acids, metals, chelated metals, metal compounds, minerals containing both metals and sulfur, metal chlorides, metal sulfates, metal sulfides, carbonates, bicarbonates, sulfur, sulfuric acid, salts of sulfuric acid, sulfur containing organic compounds, sulfur containing inorganic compounds, sulfoxides, yeast, yeast derivatives and any combinations thereof. Some of these materials, by themselves or in combination with others, may act as a fermentable organic compound.

In a further embodiment, the composition may contain a first component selected from the group consisting of carbohydrates, alcohols, esters, polymers, fats, oils, organic acids, salts of organic acids, carboxylates, aromatic hydrocarbons, carboxylic acids, salts of carboxylic acids, sugars, amino acids, salts of amino acids, and any combinations thereof. The composition may further include a second component selected from the group consisting of metals, chelated metals, metal compounds, minerals containing both metals and sulfur, metal chlorides, metal sulfates, metal sulfides, carbonates, bicarbonates, sulfur, sulfuric acid, salts of sulfuric acid, sulfur containing organic compounds, sulfur containing inorganic compounds, sulfoxides, yeast, yeast derivatives, microorganisms and any combinations thereof. In one embodiment, upon placement of between about 100 milligrams and about 30,000 milligrams of the disclosed composition in 1 liter of contaminated water comprising an amount of contaminant and after a period of several weeks to several months 10%, 20%, 30%, 40% or 50% or more of the contaminant is converted into degradation products particular to the specific contaminant or innocuous derivatives thereof. Derivatives of both contaminants and fermentable organic compounds continue to degrade to terminal end products of carbon dioxide, water and salts. In another embodiment, between about 1,000 milligrams and about 10,000 milligrams of the disclosed composition may be placed in 1 liter of contaminated water. In another embodiment, between about 5,000 milligrams and about 10,000 milligrams of the disclosed composition may be placed in 1 liter of contaminated water.

In an additional embodiment, a remediation composition may contain a first component selected from the group consisting of carbohydrates, alcohols, esters, polymers, fats, oils, organic acids, salts of organic acids, carboxylates, aromatic hydrocarbons, carboxylic acids, salts of carboxylic acids, sugars, or any combinations thereof. In another embodiment, the remediation composition may further contain a second component selected from the group consisting of metals, chelated metals, metal compounds, minerals containing both metals and sulfur, metal chlorides, metal sulfates, metal sulfides, or any combinations thereof. In another embodiment, the remediation composition may further contain a third component selected from the group consisting of amino acids, salts of amino acids, carbonates, bicarbonates, sulfur, sulfuric acid, salts of sulfuric acid, sulfur containing organic compounds, sulfur containing inorganic compounds, sulfoxides, yeast, yeast derivatives, microorganisms or a combination thereof. Upon placement of between 100 milligrams and 30,000 milligrams of the composition in 1 liter of contaminated water comprising an amount of contaminant and after a period of time, at least a portion of the amount of contaminant is converted into an innocuous derivative thereof. In one aspect, between about 1,000 milligrams and about 10,000 milligrams of the disclosed composition may be placed in 1 liter of contaminated water. In another aspect, between about 5,000 milligrams and about 10,000 milligrams of the disclosed composition may be placed in 1 liter of contaminated water.

Although contaminated water is used as an example to illustrate the inventions, the disclosed compositions and methods may be used in remediation of other contaminated sources or contaminated materials. In one aspect, the disclosed compositions and methods may be used for on-site remediation. In another aspect, the disclosed compositions and methods may also be used for off-site remediation.

EXAMPLES

The following examples illustrate the present inventions. These examples are provided for purposes of illustration only and are not intended to be limiting. The chemicals and other ingredients are presented as typical components or reactants, and various modifications may be derived in view of the foregoing disclosure within the scope of the inventions. Although many salts disclosed herein are sodium salts, potassium salts can typically be used in place of the corresponding sodium salts without departing from the spirit of the present invention.

The remediation microcosms described in the Examples may contain components that are in a size suitable for a laboratory setting. It is important to note that these small scale experiments disclosed herein may be scaled up and the principle of operation and the proportion of each component in the system may equally apply to a large-scale remediation system. Unless otherwise specified, the percentages of components used in this disclosure are on a w/w basis.

Example 1

Microcosm Tests

In a series of tests, the Microcosm contain various concentrations of fermentable electron donor, Fe-containing ISCR at a ratio of about one part Fe to one part S, an organic stabilizing agent, and a microbial inoculum containing bacteria known to convert PCE to ethene. Microcosm tests may be conducted including various concentrations of one or more combinations of the following groups of materials:

Group A—Fermentable Electron Donor:
  WilClear® sodium lactate, which contains 60% sodium lactate and 40% water
  WilClear Plus® lactate w/Accelerite®, which contains 33-40% sodium lactate, 0-8% sodium propionate, 0-8% sodium acetate, 0-8% sodium butyrate, with total sodium carboxylates within the range of 40-45%, and
  Carbohydrates/metabolites (the Accelerite® fraction is a yeast metabolite as described in U.S. patent application Ser. No. 12/049,959) at 15-20%, and 30-38% water.
Group B—Fe-Containing ISCR:
Fe(II) Gluconate
Fe(II)Chloride
$FeSO_4 \cdot 7H_2O$
Group C—Organic Stabilizing Agent:
DMSO
Cystine
Water
Group D—Inoculum:
  Inoculum containing bacteria known to convert PCE to ethene or No Inoculum As an example, one microcosm contained 100 ml ground water in a 160 ml stoppered serum bottle, 19.54 μmole PCE, 200 mg/L equivalent fermentable electron donor selected from one or more of the compounds identified above in Group A, 50 mg/L equivalent ISCR Fe(II) material with a 1:1 molar ratio of Fe to S selected from one or more of the compounds identified above in Group B, 5 mg/L equivalent organic stabilizing agent selected from one or more of the compounds identified above in Group C, and 3 ml of inoculum identified above as Group D. Other combinations of materials in each group above at various concentrations of each material may be utilized. The microcosms may include triplicate bottles with head space sampling to determine the concentration of various compounds in the dissolved phase. Sampling may be conducted on a frequency of about once every 6 days until complete dechlorination has occurred, or until certain desired effects have been achieved.

Example 2

Thiosulfate/Gluconate Physical Compatibility Screening

Physical compatibility screening tests were conducted on a mixture of sodium thiosulfate and ferrous gluconate to determine the short-term and long-term physical stability of the mixture. Ferrous gluconate was added to 25 grams of sodium thiosulfate in increments of about one gram or about 4% by weight, up to a total of 14 grams or about 52% by weight, of ferrous gluconate. Initial trials indicated that the ferrous gluconate could more readily be dissolved in the sodium thiosulfate if the mixture was slightly heated to no more than 115° F. After the addition of each increment of ferrous gluconate, the mixture was visually inspected for evidence of complete dissolution of the ferrous gluconate. Table 1 presents visual and olfactory results of each addition of ferrous gluconate.

TABLE 1

Ferrous Gluconate/Sodium Thiosulfate Mixing Observations

| Ferrous Gluconate | Mole % | Observation |
| --- | --- | --- |
| 1 g | 4% | Mild odor, dissolved when warmed |
| 2 g | 7% | Mild odor, dissolved when warmed |
| 3 g | 11% | Mod odor, dissolved when warmed |
| 4.5 g | 16% | Mod odor, dissolved when warmed |
| 5 g | 19% | Mod odor, dissolved when warmed |
| 6 g | 22% | Mod odor, dissolved when warmed |
| 7 g | 26% | Mod odor, dissolved when warmed |
| 8 g | 30% | Mod odor, dissolved when warmed |
| 9 g | 33% | Mod odor, dissolved when warmed |
| 10 g | 37% | Mod odor, dissolved when warmed |
| 14 g | 52% | Mod odor, dissolved when warmed |

The final solution was stored at room temperature for 15 days and then examined to determine relative storage stability. A small amount of precipitate was observed at that time and the solution exhibited a strong odor.

Example 3

Magnesium Sulfate/WILCLEAR® 60% Sodium Lactate Physical Compatibility Screening

Physical compatibility screening tests were conducted on a mixture of magnesium sulfate and WILCLEAR® 60% sodium lactate to determine the short-term and long-term physical stability of the mixture. Initial attempts at adding solid magnesium sulfate to WILCLEAR® 60% sodium lactate showed that the magnesium sulfate was insoluble at concentrations above 1.4% magnesium sulfate and 36% WILCLEAR® 60% sodium lactate. Solid magnesium sulfate heptahydrate was found to be soluble in water at concentrations in excess of 35%. In order to evaluate compatibility of an aqueous solution of magnesium sulfate heptahydrate and WILCLEAR® 60% sodium lactate, a solution of 35% magnesium sulfate heptahydrate in water was prepared and then added incrementally to 100 grams of WILCLEAR® sodium lactate in increments between 3 and 5 grams or about 3-5% by weight, up to a total of 20.2 grams of 35.5% magnesium sulfate heptahydrate or about 16.8% by weight. The solution was allowed to stand, unagitated, for between 5 and 10 minutes and then observed for evidence of the formation of any precipitates. The test indicated that the 35.5% magnesium sulfate heptahydrate readily stayed in solution until the concentration of 35.5% magnesium sulfate heptahydrate reached about 16%. Table 2 presents visual results of each addition of 35% magnesium sulfate heptahydrate.

TABLE 2

Magnesium Sulfate/WILCLEAR ® 60% Sodium Lactate Mixing Observations

| 35% magnesium sulfate | Weight % | Observation |
| --- | --- | --- |
| 1.3 g | 1.3% | Soluble |
| 6.3 g | 5.9% | Soluble |
| 11.6 g | 10.4% | Soluble |

TABLE 2-continued

Magnesium Sulfate/WILCLEAR® 60% Sodium Lactate Mixing Observations

| 35% magnesium sulfate | Weight % | Observation |
|---|---|---|
| 15.0 g | 13.0% | Soluble |
| 20.2 g | 16.8% | Initially soluble but precipitate formed after about 5 minutes |

The final concentration of 16.8% magnesium sulfate solution resulted in 1.66 mole % magnesium and 2.19 mole % sulfur.

Example 4

Ferrous Gluconate/WILCLEAR® 60% Sodium Lactate Physical Compatibility Screening

Physical compatibility screening tests were conducted on a mixture of ferrous gluconate and WILCLEAR® 60% sodium lactate to determine the short-term and long-term physical stability of the mixture. Initial attempts at adding solid ferrous gluconate to WILCLEAR® 60% sodium lactate showed that dilute solutions of ferrous gluconate were soluble at concentrations above 6.5% ferrous gluconate in WILCLEAR® 60% sodium lactate. In order to evaluate compatibility of higher concentrations of ferrous gluconate in WILCLEAR® 60% sodium lactate, solid ferrous gluconate in increments of 0.5 grams was added to 30 grams WILCLEAR® 60% sodium lactate up to a total of 3.5 grams of ferrous gluconate or about 10.4% by weight. The solution was heated to no more than 155° F. and allowed to stand, unagitated, for between about 10 and 15 minutes and then observed for evidence of the formation of any precipitates. The test indicated that the ferrous gluconate readily dissolved in the WILCLEAR® 60% sodium lactate through the maximum concentration of 10.4% ferrous gluconate. Table 3 presents visual results of each addition of ferrous gluconate to WILCLEAR® 60% sodium lactate.

TABLE 3

Ferrous Gluconate/WILCLEAR® 60% Sodium Lactate Mixing Observations

| Ferrous Gluconate | Weight % | Observation |
|---|---|---|
| 1.0 g | 3.2% | Readily Soluble |
| 1.5 g | 4.8% | Readily Soluble |
| 2.0 g | 6.3% | Readily Soluble |
| 2.5 g | 7.7% | Readily Soluble |
| 3.0 g | 9.1% | Readily Soluble |
| 3.5 g | 10.4% | Readily Soluble |

The final concentration of 10.4% ferrous gluconate solution resulted in 1.30 mole % iron.

Example 5

Ferrous Citrate Dibasic/WILCLEAR® 60% Sodium Lactate Physical Compatibility Screening Physical compatibility screening tests were conducted on a mixture of ferrous citrate dibasic and WILCLEAR® 60% sodium lactate to determine the short-term and long-term physical stability of the mixture. Ferrous citrate dibasic has a reported solubility in water of about 0.5 grams per liter. Initial attempts at adding solid ferrous citrate dibasic to water confirmed low solubility. A super saturated solution of 10% ferrous citrate dibasic powder in water was added to WILCLEAR® 60% sodium lactate. Results indicate that the ferrous citrate dibasic at a mass concentration of about 3.44% is not initially soluble in WILCLEAR® 60% sodium lactate but after gentle heating the material solubilizes after 15 to 30 minutes.

Example 6

Ferric Citrate/WILCLEAR® 60% Sodium Lactate Physical Compatibility Screening

Physical compatibility screening tests were conducted on a mixture of ferric citrate and WILCLEAR® 60% sodium lactate to determine the short-term and long-term physical stability of the mixture. Ferric citrate is a light brown colored powder that is readily soluble in water at 0.5%. Initial solubility tests indicate that the material is only partially soluble in water at a concentration of 20%. Adding ferric citrate at a concentration of 5% directly to WILCLEAR® 60% sodium lactate resulted in a significant amount of precipitate immediately forming and the ferric citrate changing in color from light brown to very dark brown to black.

Example 7

Ferric Ammonium Citrate/WILCLEAR® 60% Sodium Lactate Physical Compatibility Screening Physical compatibility screening tests were conducted on a mixture of ferric ammonium citrate and WILCLEAR® 60% sodium lactate to determine the short-term and long-term physical stability of the mixture. Ferric ammonium citrate is a dark orange brown powder that is readily soluble in water at a concentration of 0.5%. Initial solubility tests indicate that the material is readily soluble in water at a concentration of 10%. Ferric ammonium citrate at a concentration of 10% added directly to WILCLEAR® 60% sodium lactate showed no signs of precipitation. Ferric ammonium citrate at a concentration of 5% added directly to WILCLEAR® 60% sodium lactate was not readily soluble but became soluble after mild heating.

Example 8

Sodium Thiosulfate/WILCLEAR® 60% Sodium Lactate Physical Compatibility Screening Physical compatibility screening tests were conducted on a mixture of sodium thiosulfate and WILCLEAR® 60% sodium lactate to determine the short-term and long-term physical stability of the mixture. Sodium thiosulfate is a colorless to amber solution that typically contains 30% sodium thiosulfate. A range of between 1 gram and 21 grams of 30% sodium thiosulfate was added directly to 19 grams of WILCLEAR® 60% sodium lactate solution to evaluate compatibility. No precipitate was observed after the addition of each aliquot of sodium thiosulfate. Table 4 presents visual results of each addition of sodium thiosulfate to WILCLEAR® 60% sodium lactate.

TABLE 4

Sodium Thiosulfate/WILCLEAR ® 60% Sodium Lactate Mixing Observations

| Sodium Thiosulfate | Weight % | Observation |
|---|---|---|
| 1.0 g | 1.5% | Readily Soluble |
| 6.0 g | 7.2% | Readily Soluble |
| 11.0 g | 10.9% | Readily Soluble |
| 16.0 g | 13.6% | Readily Soluble |
| 21.0 g | 15.6% | Readily Soluble |

Example 9

Metal Salts/WILLCEAR Plus®

Another embodiment of the technology is the preparation of mixtures of metal salts with an organic with a minimal amount of water. As an example, solids such as ferric citrate powder, ferric citrate dibasic powder, and ferric ammonium citrate can be added to WILCLEAR Plus®, a blend of volatile fatty acids with minimal water content. The solid iron salts can be added directly to the WILLCEAR Plus® at concentrations sufficient to cause the WILCLEAR Plus® to increase in viscosity up to the consistency resembling that of a paste. This paste mixture will help ensure long term product storage stability and can be readily solubilized in water incorporating the characteristics of both the metal and the organic.

Example 10

Metal Salts/Lactic Acid

Another embodiment of the technology is the preparation of mixtures of metal salts with a volatile fatty acid such as lactic acid, propionic acid, butyric acid, and/or a blend of volatile fatty acids. Lactic acid can be produced with a minimum amount of water while still retaining its flow characteristics making it a candidate for formulation with a liquid form of metal compound. As an example, lactic acid at a concentration of 88% can still flow and is pumpable. The use of volatile fatty acids mixed with metal compounds in the readily flowable form and as a paste may be an optional formulation.

What is claimed is:

1. A composition comprising at least one fermentable compound, at least one metal or metal-containing compound, and a sulfur or sulfur-containing compound, wherein the composition comprises from 2% to 12% (w/w) of said at least one metal or metal-containing compound, wherein said at least one fermentable compound is selected from the group consisting of carbohydrates, esters, polymers, fats, oils, organic acids, salts of organic acids, carboxylates, aromatic hydrocarbons, carboxylic acids, salts of carboxylic acids, sugars, and combinations thereof, wherein the molar ratio between Fe and S in the composition is between about 1:2 and about 1:1.

2. The composition of claim 1, further comprising an alcohol.

* * * * *